(12) United States Patent
Walrand et al.

(10) Patent No.: US 6,647,413 B1
(45) Date of Patent: Nov. 11, 2003

(54) METHOD AND APPARATUS FOR MEASURING PERFORMANCE IN PACKET-SWITCHED NETWORKS

(75) Inventors: Jean Walrand, Berkeley, CA (US); Brian Anthony Fuller, Oakland, CA (US); Ayman Said Fawaz, Berkeley, CA (US); Fadi Abourjeily, El Cerrito, CA (US); Matthew Kenneth Siler, Berkeley, CA (US)

(73) Assignee: Extreme Networks, Santa Clara, CA (US)

( * ) Notice: Subject to any disclaimer, the term of this patent is extended or adjusted under 35 U.S.C. 154(b) by 0 days.

(21) Appl. No.: 09/321,974

(22) Filed: May 28, 1999

(51) Int. Cl.[7] .............................................. G06F 13/00
(52) U.S. Cl. ....................... 709/224; 709/249; 709/250
(58) Field of Search ................................. 709/201, 202, 709/203, 212, 213, 217, 223, 224, 227, 229, 248, 249, 250, 313

(56) References Cited

U.S. PATENT DOCUMENTS

| | | | | |
|---|---|---|---|---|
| 5,343,463 A | * | 8/1994 | Tetering et al. | 370/253 |
| 5,633,859 A | * | 5/1997 | Jain et al. | 370/234 |
| 5,682,553 A | * | 10/1997 | Osborne | 710/56 |
| 5,761,191 A | * | 6/1998 | VanDervort et al. | 370/232 |
| 5,793,976 A | * | 8/1998 | Chen et al. | 709/224 |
| 5,818,839 A | * | 10/1998 | Sterne et al. | 370/391 |
| 5,898,689 A | * | 4/1999 | Kumar et al. | 370/232 |
| 5,959,991 A | * | 9/1999 | Hatono et al. | 370/395 |
| 5,974,237 A | * | 10/1999 | Shurmer et al. | 395/200.54 |
| 6,292,466 B1 | * | 9/2001 | Droz | 370/232 |

* cited by examiner

Primary Examiner—Viet D. Vu
(74) Attorney, Agent, or Firm—Blakely Sokoloff Taylor & Zafman LLP (57) ABSTRACT

In a packet-switched network, a distributed performance measurement system is disclosed. In each node, a node monitor maintains information for each virtual channel passing through the node, including a list of the arrival times of the packets queued for the virtual channel. In addition, each node determines node performance characteristics, which may include throughput, effective rate, delay, loss rate, and occupancy. The network further includes a network monitor, which periodically collects the node performance characteristics from each node and determines performance characteristics for each virtual channel in the network, end-to-end. The network performance characteristics may include throughput, effective rate, delay, loss rate, and occupancy. The results are useful for network operators and users to optimize the network and/or their use of the network.

33 Claims, 5 Drawing Sheets

|       | HEAD PACKET ADDRESS | TAIL PACKET ADDRESS | START OF BUSY CYCLE |
|-------|---------------------|---------------------|---------------------|
| VC1   | addr4               | addr5               | b1                  |
| VC2   |                     |                     |                     |
| VC3   |                     |                     |                     |
| ⋮     |                     |                     |                     |
|       |                     |                     |                     |
| FREE LIST | addr7           | addr3               |                     |

Fig. 4a

|        | TIME STAMP | NEXT ADDRESS |
|--------|------------|--------------|
| addr1  | t3         | addr11       |
| addr2  |            |              |
| addr3  |            | end          |
| addr4  | t1         | addr9        |
| addr5  | t5         | end          |
| addr6  |            |              |
| addr7  |            | addr13       |
| addr8  |            |              |
| addr9  | t2         | addr1        |
| addr10 |            |              |
| addr11 | t4         | addr5        |
| addr12 |            |              |
| addr13 |            | addr3        |
| ⋮      | ⋮          |              |

METHOD AND APPARATUS FOR MEASURING PERFORMANCE IN PACKET-SWITCHED NETWORKS

FIELD OF INVENTION

The invention relates generally to computer and communication networks. More specifically, the invention relates to measuring the performance of such networks.

BACKGROUND

In communications technology, there is an ever-increasing demand for high-performance networks, and in particular, a demand for high-performance Internet access. This increased demand has led to the development of improved networks capable of handling larger volumes of data with smaller delays.

Communications networks, such as ATM networks or the Internet, are generally formed with a number of transmission links interconnected with switches. A transmission link is any medium through which signals are communicated and can be single or multiple twisted pairs, optical fiber, coaxial cable, radio links, or other mediums. A switch is a device with one or more input ports and one or more output ports. The switch directs bits arriving at an input port to the appropriate output port. Switching in communications is accomplished using one of two methods: circuit switching and packet switching. Only packet switching is relevant for the purposes of the present discussion.

In packet switching, the data in a data stream is divided into "packets." In addition to a portion of data, each packet carries various identifying information about the data. Such identifying information includes routing information, for instance, source and destination addresses for the data. When a packet arrives at a switch, it is stored in a buffer. The switch looks at the routing information in the packet and routes the packet to the appropriate output port. The packets are then forwarded one "hop" (or switch) at a time, until they reach their destination.

Generally in packet switching, each packet in a particular data stream does not necessarily follow the same path to its destination as the others. Nonetheless, certain types of packet switching, e.g., ATM, do specify the path that the packets are to follow between the switches for a particular end-to-end connection. Such a predetermined path is typically referred to as a "virtual channel."

Unlike general packet switching where packets are not guaranteed to arrive in the order they were sent, when virtual channels are specified, all of the packets follow the same route along the virtual channel, thereby guaranteeing the order of arrival. These "virtual channels" have greatly enhanced the performance of networks in using resources efficiently and can usually provide a minimum "quality of service", i.e., a minimum bandwidth provided between two points, A and B.

In order to maintain this quality of service, switches monitor packets that pass through them. For instance, switches will typically count the packets they transport per port and/or virtual channel and count the number of packets that are dropped. This monitoring allows a particular switch to send messages to other switches. For instance, if a switch becomes overloaded or saturated with packets it may notify other upstream switches to slow down or stop transmission. Or this monitoring may cause a switch to take other actions. For instance, if too many packets arrive for a particular virtual channel, the switch may drop some of them in order to keep the virtual channel from usurping the transmission links from other virtual channels (and thereby deny the other virtual channels their minimum quality of service).

Yet, while this monitoring is sufficient to ensure a minimum quality of service for each virtual channel, this monitoring generally does not evaluate the actual performance or usage of a switch, a virtual channel, or the network as a whole. Hence, a network operator cannot readily determine what resources are available on a network, what resources are being wasted, or if a switch is not performing optimally. The provision of such information has generally been deemed too costly and complicated.

SUMMARY

A system and method in accordance with the invention provide a scheme by which the performance of a network can be easily monitored. In general, an embodiment of the invention determines values related to the length of time packets are present in a node, including effective rate for a virtual channel in a node and/or delay for a virtual channel in a node. "Effective rate" is used herein to mean the throughput rate during the time when a given virtual channel is busy, having packets in its queue.

More specifically, some embodiments of the invention are used in a packet-switched network comprised of a plurality of nodes. In each node there is a node monitor. In one embodiment, the node monitor maintains information for each virtual channel that passes through the node. The information maintained includes the time of arrival of packets in the queue for the virtual channel. In one embodiment, such information is maintained in a linked list. The node monitor further utilizes the information maintained to determine node performance characteristics. In one embodiment, these node performance characteristics include throughput, effective rate, loss rate, delay, and occupancy for each virtual channel carried by the node.

In some embodiments, the node monitor is split into an epoch monitor and an aggregate monitor. The epoch monitor monitors the packets as described above and performs simple calculations such as counting, adding, and comparing. The aggregate monitor performs more processing-intensive calculations.

A network in accordance with one embodiment of the invention further includes a network monitor. Periodically, the network monitor receives the node performance characteristics from each node and then determines overall performance characteristics for the virtual channels in the network from end to end (from the virtual channel source to its destination). This information may then be provided in a report to a network operator or one or more users, who can then use the information to optimize the network and/or their use of the network.

Hence, in accordance with one embodiment of the invention, system performance measurements are taken in a distributed manner, e.g., low-level (in the epoch monitor), mid-level (in the aggregate monitor), and network (in the network monitor). Such a distributed performance measurement system allows network performance to be monitored and avoids interference with packet flow without taxing the resources of any one node or the network overall.

BRIEF DESCRIPTION OF THE DRAWINGS

The present invention is described with respect to particular exemplary embodiments thereof and reference is accordingly made to the drawings in which.

DETAILED DESCRIPTION

In order to overcome the disadvantages discussed above, a method and system in accordance with the invention provides a simple and relatively low cost way to monitor a network, its performance and its available resources. In general, an embodiment of the invention maintains monitoring circuitry in every switch or other node to monitor all packets that flow through the node. As well, an embodiment in accordance with the invention maintains three levels of calculations and measurements: one low level set performed at the node, a second more calculation intensive set also performed at the node, and a high level set for evaluating characteristics of the entire network. This distributed measurement system allows resources to be allocated efficiently and avoids interference with normal packet flow through the switch. Details are fully described below.

Figure 1:
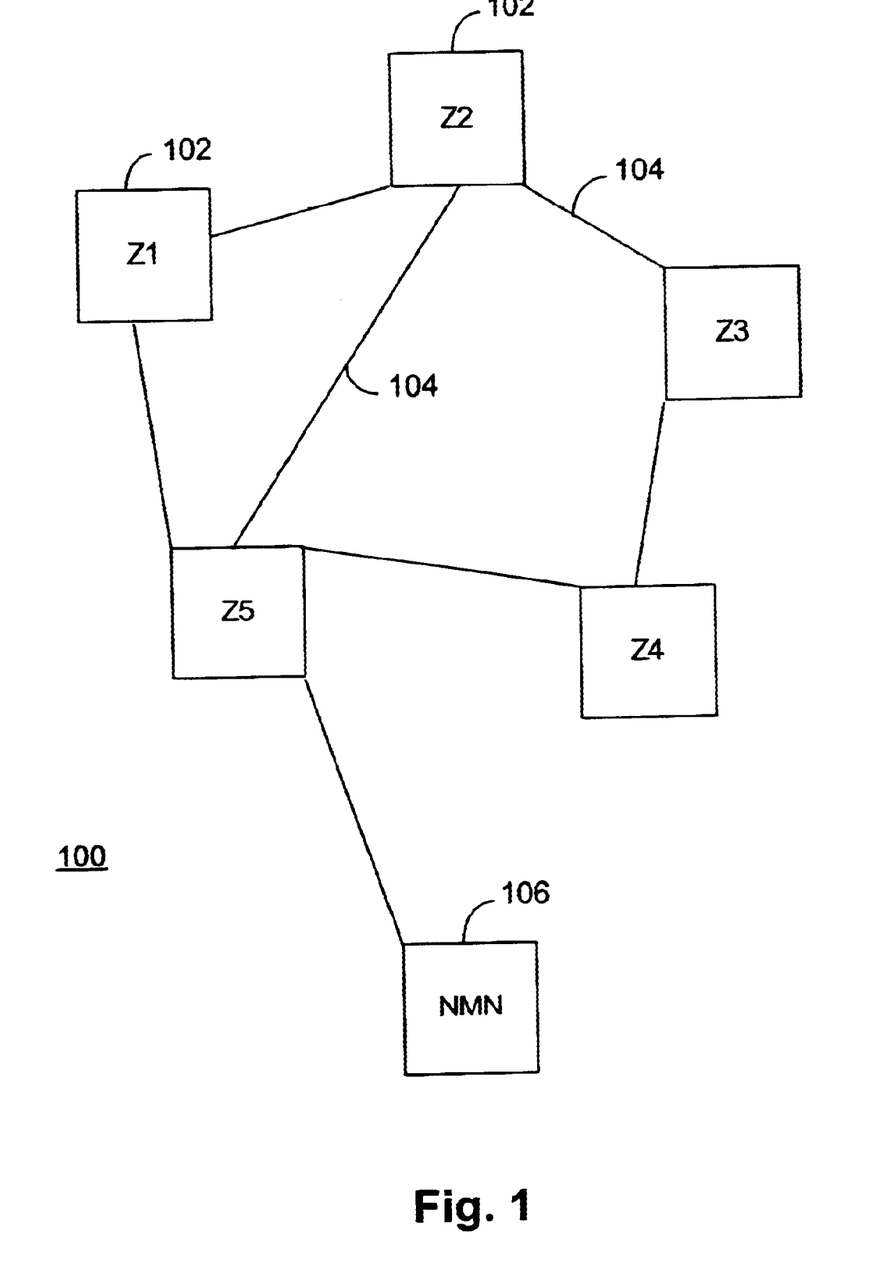
FIG. 1 is a generalized block diagram of a network in accordance with one embodiment of the invention.

FIG. 1 shows a network in accordance with the invention. Network 100 is composed of a plurality of switches and other nodes 102, Z1-Z5, generally referred to herein as "nodes." Each node is connected to one or more other nodes by way of a transmission links 104. In addition, a network monitor node (NMN) 106 is in communication with one or more nodes 102.

The nodes 102 are utilized in virtual channels. As described previously, a virtual channel is a predesignated path for packets to follow from a source to a destination. For example, referring to FIG. 1, packets transmitted from node Z1 to node Z4 may follow a path (a virtual channel) defined by the transmission links from Z1 to Z5 and then from Z5 to Z4. Alternatively, a virtual channel from Z1 to Z4 could be set up using the link from Z1 to Z2, then the link from Z2 to Z3, then the link from Z3 to Z4. In either case, for the particular connection from Z1 to Z4, packets will always follow the same path. Virtual channels and the processes for their establishment are well known in the art and are often used in communications protocols such as ATM (asynchronous transfer mode) or IP (Internet protocol), which uses MPLS (multiprotocol label switching).

Each node 102 in network 100 includes hardware, software, and/or firmware for monitoring packets as they pass through each node and for performing certain analyses on the data collected by monitoring. After a specified period of time, the network monitoring node 106, also including hardware, software, and/or firmware, collects information from the nodes 102 for further analysis and report preparation. These reports are useful to allow a network operator or user to evaluate network performance and available resources. Further details of the monitoring and analysis process are discussed below.

Figure 2:
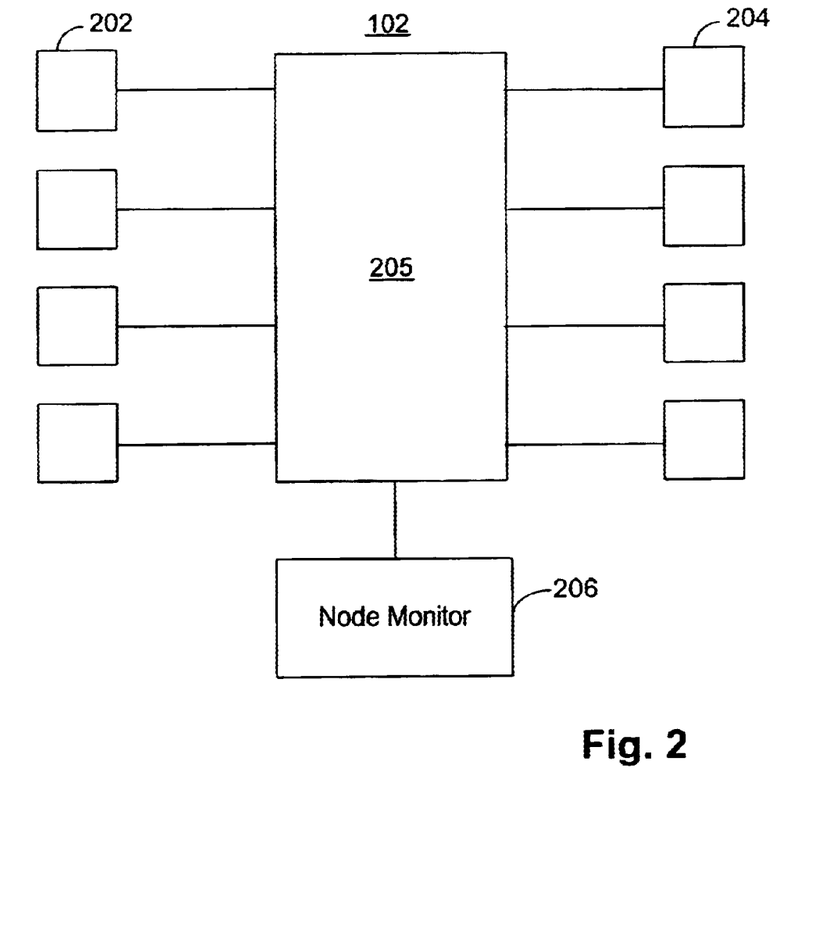
FIG. 2 is a generalized block diagram of a switch in accordance with one embodiment of the invention.

A generalized block diagram of a node 102 in accordance with an embodiment of the invention is shown in FIG. 2. As shown, each node has one or more input ports 202 and one or more output ports 204. Four input ports 202 and four output ports 204 are shown for the purposes of illustration. In addition, each node includes switching logic 205, which includes all of the circuitry, memory, databases, instructions, and any other requirements for routing a packet from an input port 202 to the appropriate output port 204 in accordance with the virtual channel along which the packet is to be routed. As packets arrive, the switching logic 205 parses the packet and determines the virtual channel to which the packet belongs. The switching logic 205 then places the packet into an appropriate outgoing queue for the particular virtual channel. In the event that an output port services more than one virtual channel, packets from the queue will be multiplexed in some fashion on the outgoing transmission link as is understood in the art.

Figure 3:
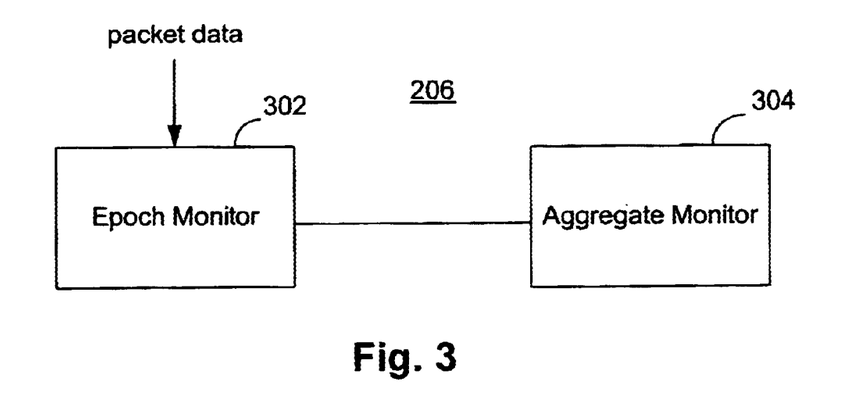
FIG. 3 is a generalized block diagram of a node monitor in accordance with one embodiment of the invention.

In addition, in accordance with one embodiment of the invention, each node includes a node monitor 206 for passively monitoring packets as they pass through node 102. More specifically, as shown in FIG. 3, in one embodiment each node monitor includes an epoch monitor 302 and an aggregate monitor 304. The epoch monitor 302 passively monitors the packets as they pass through node 102 and maintains an image of each virtual channel queue by using a set of linked lists. Two data structures, shown in FIGS. 4a and 4b, maintain this set of linked lists: one linked list per each virtual channel passing through the node plus one linked list of "free" locations. The linked list for a particular virtual channel specifies the arrival times of the packets that are currently in the node for that virtual channel in the order of arrival.

Figure 4A:
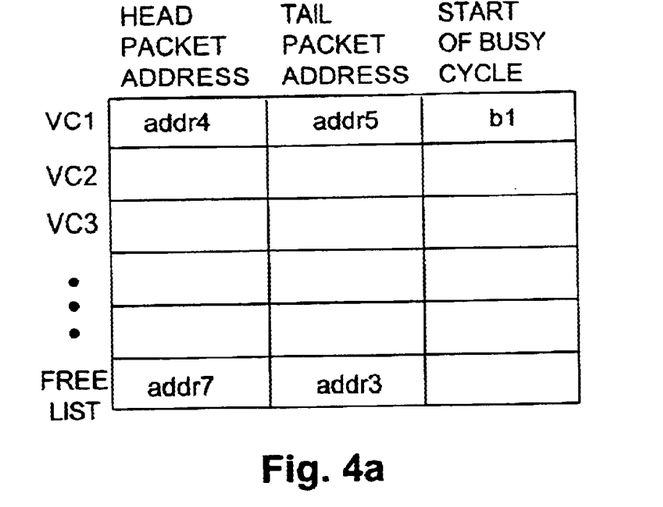
FIG. 4 is a representational diagram of the data structures utilized in accordance with one embodiment of the invention to monitor packets.
Figure 4B:
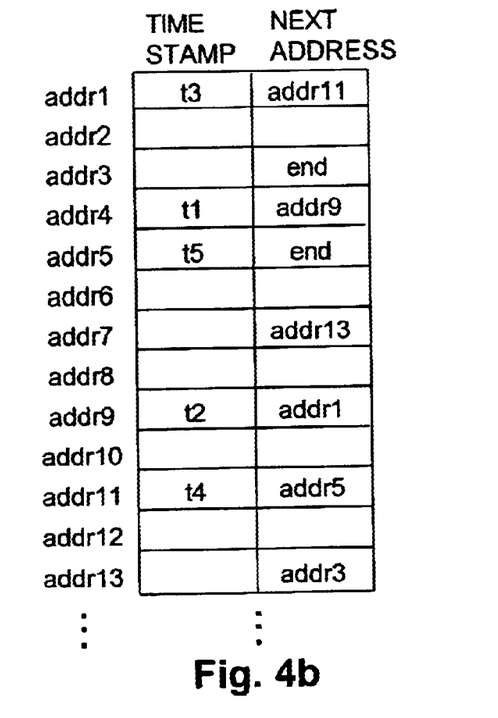

In particular, for each virtual channel the data structure of FIG. 4a maintains an entry pointing to an address in the data structure of FIG. 4b that is representative of the first-to-arrive packet in the queue of the virtual channel, a "head" packet. As well, the data structure of FIG. 4a maintains an entry pointing to an address in the data structure of FIG. 4b that is representative of the last-to-arrive packet in the queue for the same virtual channel, a "tail" packet.

The data structure of FIG. 4b maintains linked lists of information corresponding to each virtual channel queue. In particular, in one embodiment each packet is represented by two entries: a time stamp, indicative of the packet arrival time at the node, and a pointer to the address containing information about the next packet in the virtual channel's queue. Other embodiments may contain additional information for packets.

For example, the data structure of FIG. 4a shows that for virtual channel 1 (where each row of entries in the data structure corresponds to a distinct virtual channel) the first entry in the data structure of FIG. 4b is located at addr-4 and the last entry in the data structure of FIG. 4b is at addr-5. The head of the linked list, addr-4, shows an arrival time of time t1 for the first packet in the queue and points to addr-9, the address holding information regarding the second packet in the queue. Addr-9 shows an arrival time of time t2 for the second packet in the queue and points to addr-1, the address holding information regarding the third packet in the queue. Addr-1 shows an arrival time of time t3 for the third packet and points to addr-11, the address holding information regarding the fourth packet in the queue. Addr-11 shows an arrival time of time t4 for the fourth packet and points to addr-5, the address holding information for the fifth and last packet in the queue for virtual channel 1. Addr-5 shows an arrival time of time t5 for the fifth packet and also includes an end of list indicator, indicating that there are no more packets in the queue.

In addition to a linked list for each virtual channel, the data structures of FIGS. 4a and 4b also maintain a "free" list, a linked list of the unused address spaces in the data structure of FIG. 4b. Like the entries for virtual channels, FIG. 4a gives an entry for the first free address in the linked list of free addresses (e.g., addr-7) and an entry for the last free address (e.g., addr-3).

At each event (the arrival or departure of a packet from the node), the data structures of FIG. 4 are updated. For instance, upon the arrival at time t6 of a new packet for virtual channel 1, the arrival time t6 of the packet is written in the first address location of the free list, e.g., addr-7, in the data structure of FIG. 4b. The second entry of addr-7 is changed from addr-13 to "end" and the second entry at location addr-5 is changed from "end" to addr-7. Moreover, in the data structure of FIG. 4a, the head entry of the free list is changed from addr-7 to addr-13 and the tail entry for virtual channel 1 is changed from addr-5 to addr-7.

Although only entries are discussed in FIGS. 4a and 4b with respect to virtual channel 1 and the free list, it is to be understood that entries for all virtual channels for the node will be found in these two data structures in many embodiments of the invention. Virtual channel 1 entries and free list entries are shown without entries for other virtual channels for clarity of the illustration.

In addition to the head and tail entries corresponding to the linked list representing the queue for each virtual channel, the data structure of FIG. 4a further maintains an entry for each virtual channel entitled "Start of busy cycle." Start of busy cycle indicates the time at which the virtual channel became busy and the last time that the queue was empty.

Using the information stored in the data structures of FIGS. 4a and 4b, each epoch monitor 302 (FIG. 3) maintains measurements for each virtual channel. These measurements are listed in Table 1 below:

TABLE 1

EPOCH MONITOR

| Description | Name |
| --- | --- |
| Number of Cells | $C_n$ |
| Number of Packets | $P_n$ |
| Busy Time | $T_n$ |
| Peak Delay | $D_n$ |
| Total Delays of the $P_n$ packets | $S_n$ |
| Number of Lost Packets | $L_n$ |
| Maximum Occupancy of Queue | $Q_n$ |

Each of the above measurements is taken over one or more epochs. An "epoch," as used herein, refers to a unit of time, whatever that unit is selected to be. For instance, in one embodiment of the invention, an epoch is one second. In another embodiment of the invention, an epoch may be one tenth of a second. An epoch is sometimes referred to herein in shorthand as τ. The subscripted "n" attached to each of the above measurement names refers to an epoch number. For instance, for the first monitored epoch, n=1, for the second monitored epoch, n=2, etc.

Because packets are often a variable length, in some embodiments of the invention for ease of manipulation packets are subdivided into "cells" on arrival at a node. A cell is 48 bytes in one embodiment of the invention. The cells are reassembled into packets before leaving the node. Hence one measurement taken is the Number of Cells, $C_n$, that leave the node 102 during a particular epoch. In some embodiments of the invention, the number of bytes are monitored instead of the number of cells. In either case, the number of bytes can be easily determined by maintaining a cell count. In addition, some embodiments of the invention may maintain a cell count by counting packets as they arrive at the node instead of when they leave.

Another measurement taken by epoch monitor 302 in one embodiment is the Number of Packets, $P_n$, that leave at the node 102 during a particular epoch. Like $C_n$, $P_n$ can alternatively be determined in some embodiments as packets arrive.

Figure 5:
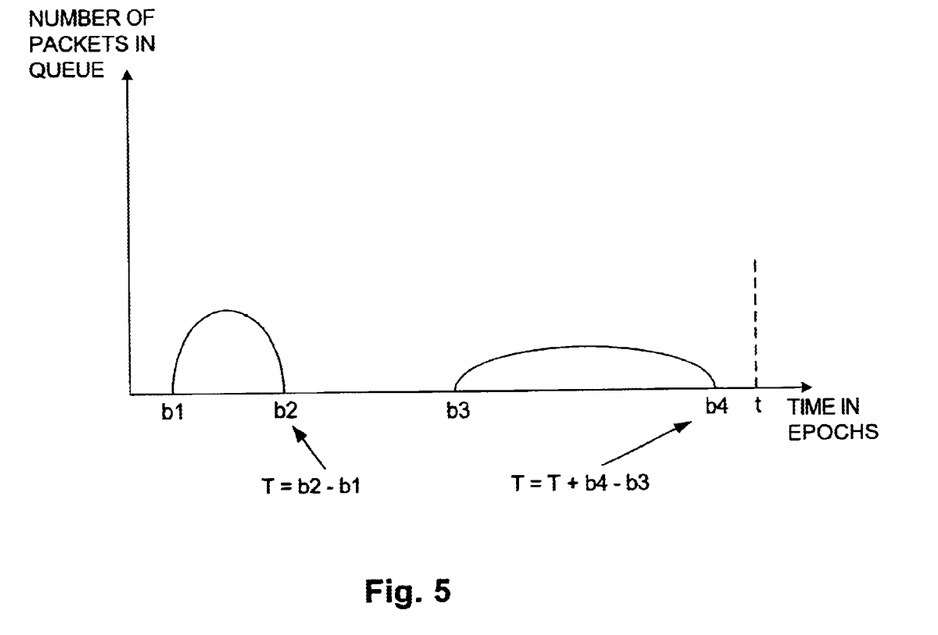
FIG. 5 is an illustration of the determination of busy time in accordance with one embodiment of the invention.

Busy Time, $T_n$, refers to the time when the queue for the virtual channel being monitored is not empty. Busy time can be computed utilizing the entries in the data structure of FIG. 4a. For instance, referring to FIG. 5, for virtual channel 1, assume that for a particular epoch there are two bursts of data: the first starting at time b1 and ending at time b2 and the second starting at time b3 and ending at time b4. Using the information of FIG. 4a, in one embodiment busy time can be determined by subtracting b1 from the current time. When the queue becomes empty again the busy time value is stored, for instance in a register. At time b3, when the queue becomes busy again, busy time is determined by subtracting b3 from the current time and adding the result to the previous busy time, which has been stored.

Peak Delay, $D_n$, refers to the highest delay time a packet in the queue experiences from the time of its arrival (marked with a time stamp in FIG. 4b) to the time of its departure. Delay can be easily determined by subtracting the arrival time, stored in FIG. 4b, of a packet from its departure time. Peak delay is then determined by taking the maximum of the delays determined for all packets in the epoch.

Total Delay, $S_n$, refers to the sum of the delays from arrival to departure at the node for each packet in the virtual channel queue during a particular epoch.

Number of Lost Packets, $L_n$, refers to the number of packets dropped or otherwise lost for a particular queue. And Maximum Occupancy, $Q_n$, refers to the maximum number of packets in the queue during a particular epoch.

It is to be understood that many embodiments of the invention do not require maintenance of each value listed in Table 1.

At the epoch monitor, it is desirable to be able to maintain these measurements as the packets arrive/depart. Hence, it is desirable that the hardware, software, and/or firmware used for these measurements be able to perform quickly. Therefore, hardware, software, and/or firmware used to maintain these measurements is fast, but has little processing power (which might cause sacrifice to speed). In one embodiment of the invention, the measurements of Table 1 are taken and maintained easily by using counters, registers (or other memory units), adders, and/or comparators.

In one embodiment, after a predesignated period in which a number N of epochs (Nτ) have passed, the epoch monitor 302 passes its measurements on to aggregate monitor 304. At that time, epoch monitor resets all of its measurements and begins again.

Aggregate monitor 304, however, further processes the data transferred to it from epoch monitor 302. Unlike epoch monitor 302, aggregate monitor 304 has more powerful processing capabilities and may in some embodiments include a DSP among other hardware, software, and/or firmware. Aggregate monitor 304 utilizes the information received from epoch monitor 302 to obtain the following measurements for the given period as listed in Table 2.

TABLE 2

AGGREGATE MONITOR

| Description | Name/Definition |
| --- | --- |
| Total Number of Cells | $C = C_1 + \ldots + C_N$ |
| Total Number of Packets | $P = P_1 + \ldots + P_N$ |
| Total Busy Time | $T = T_1 + \ldots + T_N$ |
| Total Lost Packets | $L = L_1 + \ldots + L_N$ |
| Average Throughput | $ATh = C/N\tau$ |
| Peak Throughput | $PTh = \max \{C_1, \ldots, C_N\}/\tau$ |
| Average Effective Rate | $AEff = C/T$ |
| Minimum Effective Rate | $MEff = \min \{C_1/T_1, \ldots, C_N/T_N\}$ |
| Maximum Occupancy | $Q = \max \{Q_1, \ldots, Q_N\}$ |
| Average Loss Rate | $LR = L/P$ |
| Average Delay | $A = \{S_1 + \ldots + S_N\}/P$ |
| Delay Deviation | $DD = \sqrt{\sum_{n=1}^{N} \frac{\left(\frac{S_n}{P_n} - A\right)^2}{N-1}}$ |
| Peak Delay | $PD = \max \{D_1, \ldots, D_N\}$ |
| Average Delays over First M Epochs | $A_1 = (S_1 + \ldots + S_M)/(P_1 + \ldots + P_M)$ |
| Average Delays Over Consecutive Sets of M Epochs | $A_2, \ldots, A_K$ (defined similarly to $A_1$) $A_0$ represents the average delay over the M epochs that precede the current period. |
| Delay Fluctuation | $DF = \sum_{j=1}^{K} \sum_{i=1}^{M} \left\lvert \frac{S_{M(j-1)+i}}{P_{M(j-1)+i}} - A_{j-1} \right\rvert$ |

The Total Number of Cells, C, for the period is computed by taking each $C_n$ (where $n=1, \ldots, N$) and summing. The Total Number of Packets, P, for the period is computed by taking each $P_n$ and summing. The Total Busy Time, T, and Total Lost Packets, L, are computed in similar manner.

"Throughput" is the total number of cells (bytes) to pass through the switch in a given time period. In one embodiment, aggregate monitor determines Average Throughput by dividing the Total Number of Cells C by $N\tau$. The Peak Throughput is determined by dividing the maximum number of cells (bytes) that leave the switch during any epoch of the period by $\tau$.

Effective Rate is defined herein as the throughput rate when there was actually data in the queue. In one embodiment, the Average Effective Rate is determined by dividing the Total Number of Cells C by the Total Busy Time T. The Minimum Effective Rate is calculated by determining $C_n/T_n$ for each epoch and then taking the minimum.

Maximum Occupancy Q is determined by taking the maximum of the Maximum Occupancies $Q_n$ for all epochs in the current period. And the Average Loss Rate is determined by dividing the Total Lost Packets L by the Total Number of Packets P.

The Average Delay is determined by summing the Total Delays $S_n$ for each epoch and dividing by the Number of Packets P in the current period. Delay Deviation is the standard deviation of the average delays per epoch over N epochs. Peak Delay is determined by taking the maximum of the Peak Delays for all epochs in the current period.

Finally, in one embodiment the aggregate monitor performs an additional set of unique calculations relating to Delay Fluctuation. Delay Fluctuation is calculated to determine how good the data related to delay is for a given time period. In other words, if the delay values fluctuate considerably, the delay information for that time period may not be as relevant as that in other time periods.

One way to estimate the variability of the delay is to calculate the delay deviation. To do that calculation, however, requires the storage of all delay values $S_1, \ldots, S_N$ for $N\tau$ seconds before the average A can be found and before the calculation can be performed.

Figure 6:
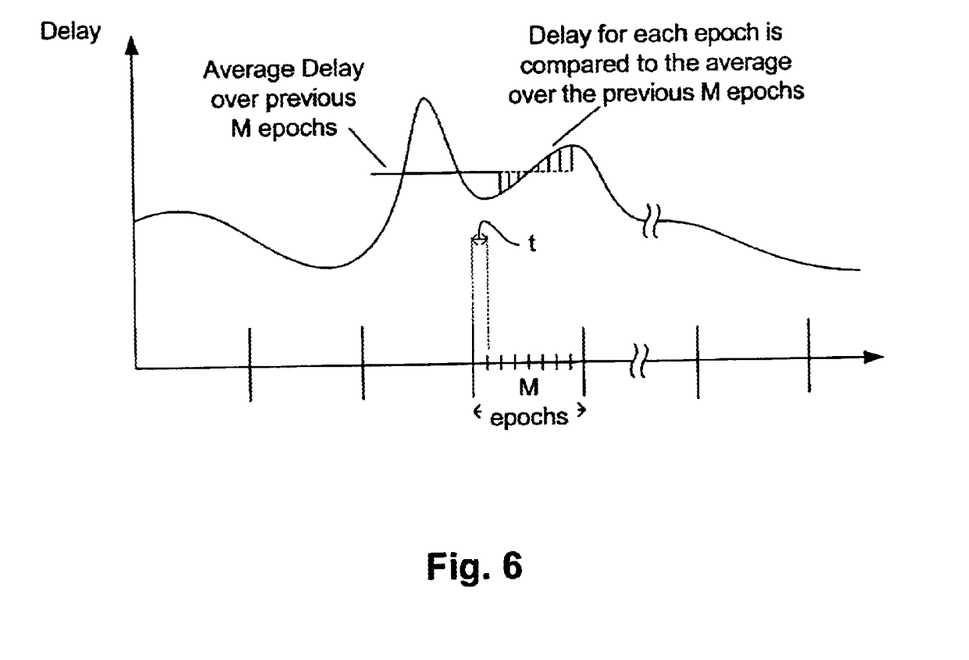
FIG. 6 is a diagram utilized to illustrate a delay fluctuation calculation in accordance with one embodiment of the invention.

Therefore, in one embodiment of the invention a method for calculating Delay Fluctuation is utilized that does not require such storage. Instead, for every epoch, the Delay Fluctuation is calculated by taking the absolute value of the difference between the average delay over that epoch ($S_n$) and the average delay over the previous M epochs, where N–KM and K is rather large (e.g., K=10). FIG. 6 illustrates, showing a graph where the X-axis represents time in epochs and the Y-axis represents delay. As shown, a period defined by $N\tau$ is divided into K sets of $M\tau$. First, the average delay for each epoch in a set of M epochs (for instance, the fourth set) is compared to the average delay over the previous set of M epochs (e.g., the third set of M epochs) by subtracting the two and taking the absolute value. This comparison is performed for each epoch in the current set of M epochs (e.g., the fourth set) and the results are then summed. This process is repeated for all sets of M epochs in the time period and the results from each set of M epochs are summed, where $M=1 \ldots K$. These comparisons and sums can be expressed as follows:

$$\sum_{j=1}^{K} \sum_{i=1}^{M} \left\lvert \frac{S_{M(j-1)+i}}{P_{M(j-1)+i}} - A_{j-1} \right\rvert,$$

where j is the jth set of M epochs, where i is the specific epoch in the jth set of M epochs, and where $A_{j-1}$ is the average over the previous M epochs, and is calculated as described above by summing the delays for each epoch and dividing by the total number of packets in the set of M epochs. The average delay for M epochs is as follows:

$$A_j = \frac{\sum_{i=1}^{M} S_{M(j-1)+i}}{\sum_{i=1}^{M} P_{M(j-1)+i}}.$$

Although a number of measurements and/or calculations are described above, it is to be understood that not all of these measurements and/or calculations need be performed by all embodiments of the invention.

To determine how each virtual channel and the network is performing overall, the network monitor 106 periodically polls the nodes 102 to fetch the data stored by aggregate monitor 304. In one embodiment data is stored in the node utilizing a double buffering scheme: node 102 first writes a first buffer and, when done (either when full or when a first set of data is complete), will write to a second buffer. When the node 102 writes to the second buffer, the network monitor 106 is free to retrieve data from the first buffer, and vice versa. Other embodiments of the invention may use other methods to provide "slack" time to allow for retrieval of data by the network monitor 106.

In one embodiment, the data retrieved or otherwise received from node 102 is provided with a version number by the node to prevent confusion to the network monitor 106. The network monitor then combines the information it receives from all nodes, computing the following quantities for each entire virtual channel, end-to-end, shown in Table 3. It is to be understood that not all embodiments will require the computation of each quantity listed in Table 3. It is to be understood that not all embodiments will require the computation of each quantity listed in Table 3.

TABLE 3

Virtual Channel

| | | |
|---|---|---|
| Throughput | Average ($ATh_{vc}$) | Should be approximately the same at all nodes; determined using the Average Throughout determined by the first node in the virtual channel $ATh_{vc} = Ath(z)$, where $z = 1$ |
| | Peak ($PTh_{vc}$) | maximum of Peak Throughputs determined by each node $PTh_{vc} = \max\{Th(z)\}$ where $z = 1, \ldots, Z$ |
| Effective Rate | Average ($AEff_{vc}$) | minimum of Average Effective Rates determined by each node $AEff_{vc} = \min\{AEff(z)\}$, where $z = 1, \ldots, Z$ |
| | Minimum ($MEff_{vc}$) | minimum of Minimum Effective Rate determined by each node $Meff_{vc} = \min\{MEff(z)\}$ where $z = 1, \ldots, Z$ |
| Delay | Average ($A_{vc}$) | sum of Average Delay determined by each node $$A_{vc} = \sum_{z=1}^{Z} A(z)$$ |
| | Deviation Fluctuation ($DF_{vc}$) | The sum of the Fluctuations determined at each node for the virtual channel $$DF_{vc} = \sum_{z=1}^{Z} DF(z),$$ |
| | Peak ($PD_{vc}$) | Average Delay for the virtual channel plus three times Fluctuation for the virtual channel $PD_{vc} = A_{vc} + 3DF_{vc}$ |
| Loss Rate | Average ($LR_{vc}$) | Sum of the Average Loss Rates determined by each node. $$LR_{vc} = \sum_{z=1}^{Z} LR(z),$$ |
| Occupancy | Maximum per node ($Q_{vc}$) | maximum of the Maximum Occupancies calculated by each node. $Q_{vc} = \max\{Q(z)\}$, where $z = 1, \ldots, Z$ |

At the network, throughput is determined for a given virtual channel. Average Throughput should generally be the same or similar at each node, so the determination of the Average Throughput from any node can be utilized. Table 3 suggests using the Average Throughput determined by the first node in the virtual channel, but the Average Throughput determined by any node will be satisfactory. Peak Throughput for the virtual channel is determined by comparing the Peak Throughput determined by each node and taking the maximum. As shown in Table 3 for Peak Throughput and other determined values, z is representative of a given node in a virtual channel, when the virtual channel includes nodes 1 through node Z.

Effective rate is also determined for each virtual channel. Average Effective Rate for a virtual channel is determined in one embodiment by comparing the Average Effective Rate determined by each node and taking the minimum value. Minimum Effective Rate for the virtual channel is determined by comparing the Minimum Effective Rate determined by each node and taking the minimum.

For each virtual channel, in one embodiment, various delay measurements are also determined. Average Delay for a virtual channel is determined by summing the Average Delay values determined at each node. Delay Fluctuation is determined by summing the Delay Fluctuation determined by each node. Peak Delay for the virtual channel is then conservatively determined by summing the Average Delay for the virtual channel with three times the Fluctuation for the virtual channel. Peak Delay is thus an estimate and assumes a Gaussian distribution.

Loss rate for the virtual channel is determined by summing the Average Loss Rates determined by each node. And Occupancy for the virtual channel is determined by comparing the Maximum Occupancy determined at each node and taking the maximum.

The measurements made by the network monitor 106 for the virtual channels can be made more accurate by synchronizing the node monitors 206 in each node 102. Synchronization ensures that the measurement epochs in the nodes correspond to approximately the same packets that flow through the nodes. For instance, if node Z1 monitors packets 1, 2, 3, 4, and 5 in a first epoch, then it is desirable that the next node in the virtual channel, say node Z2, will monitor the same packets 1–5 in a corresponding epoch. One method to achieve such synchronization uses the network time protocol, which is well known in the art and commonly used by computers on the Internet for clock synchronization. An alternative method for synchronization used in other embodiments of the invention is for the network monitor 106 to periodically, e.g., once a day, send a synchronization command to all the node monitors 206.

In one embodiment, the network monitor node prepares reports for use by the network operator and/or other network users based upon the data in Table 3. A network operator may use the information provided in these reports to verify and improve network operation. For instance, the operator can adjust the "overbooking" of particular links to satisfy quality of service promised to particular users while optimizing his/her revenues. The operator may also use this information to implement usage-based billing. Alternatively, if a network user receives this information, the network user may be able to adjust his/her virtual channel requests. For instance, the user may discover his/her actual needs are less than expected. These are only a few of the possible uses the information provided may permit.

Hence a method and system has been described for monitoring the performance characteristics of an entire network and doing so without placing undue burdens on any nodes or influencing the flow of data. Further, a system and method in accordance with the invention is relatively low cost and easily implemented.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method comprising:
   determining an effective rate for a virtual channel in a node including determining the total number of cells to pass through the node during a predetermined period of time, and calculating a portion of the predetermined period of time during which a queue for the virtual channel of the node is not empty the effective rate based on a throughput rate when there Is data in a queue corresponding to the virtual channel; and providing the determined effective rate for a virtual channel to a network monitor.

2. A method for use with a network that transmits packets through virtual channels, comprising:

determining a value related to the length of time one or more packets are present in a node wherein determining the value further includes determining effective rate for a virtual channel in the node and delay for the virtual channel in the node, wherein effective rate is based on throughput rate when there is data in a queue corresponding to the virtual channel.

3. The method of claim 2, wherein determining effective rate for a virtual channel in a node includes determining busy time for said virtual channel in said node.

4. The method of claim 2, further including:

determining effective rate for a virtual channel from end to end;

determining delay for a virtual channel from end to end.

5. The method of claim 4, wherein delay includes at least one of average delay or peak delay.

6. The method of claim 2, wherein determining delay for a virtual channel in a node includes maintaining a linked list of information representative of a queue for said virtual channel, wherein said information includes the arrival time of each packet.

7. A system for use with a network for transmitting packets trough virtual channels, wherein said network includes a plurality of nodes, said system designed to measure effective rate for a virtual channel in a node and for a virtual channel end-to-end, wherein effective rate is based on throughput rate when there is data in a queue corresponding to the via channel, and designed to measure delay for a virtual channel in a node and for a virtual channel end-to-end.

8. The system of claim 7, wherein said system is further designed to measure busy time for a node.

9. The system of claim 7, wherein delay includes at least one of average delay or peak delay.

10. The system of claim 9, wherein delay for a virtual channel in a node further includes delay fluctuation.

11. A system for use with a network for transmitting packets through virtual channels, wherein said network includes a plurality of nodes, said system comprising:

means for measuring effective rate for a virtual channel in a node, wherein effective rate is based on throughput rate when there is data in a queue corresponding to the virtual channel; and means for measuring delay for a virtual channel in a node.

12. The system of claim 11, further including:

means for measuring effective rate for a virtual channel end-to-end; and means for measuring delay for a virtual channel end-to-end.

13. The system of clam 11, wherein delay includes average delay, peak delay, and delay fluctuation.

14. The system of claim 11, further including:

means for synchronizing said plurality of nodes.

15. A node for use in a packet-switched network that utilizes virtual channels, including:

a node monitor designed to maintain information for each of a plurality of virtual channels passing through said node, said information including the time of arrival of packets in a virtual channel queue in said node, and said node monitor designed to utilize said information to determine node performance characteristics of each virtual channel in said node, said node performance characteristics including at least one of the group including effective rate for a virtual channel in said node, wherein effective rate is based on throughput rate when there is data in a queue corresponding to the virtual channel and delay for said virtual channel in said node.

16. The node of claim 15, wherein said node monitor includes:

an epoch monitor, wherein said epoch monitor monitors the arrival and departure of packets to and from said node over N epochs, maintains information for each of said packets, and, using said information, performs simple calculations to determine epoch-level performance characteristics over each epoch;

an aggregate monitor, wherein said aggregate monitor is in communication with said epoch monitor and, after said N epochs, receives said epoch-level performance characteristics from said epoch monitor and, using said epoch-level performance characteristic, performs more processing-intensive calculations than said epoch monitor to determine node-level performance characteristics.

17. The node of claim 15, wherein said node monitor includes a linked list of the arrival times of said packets for each virtual channel queue in said node.

18. The node of claim 15, wherein delay includes average delay and peak delay.

19. The node of claim 18, wherein said node performance characteristics further include throughput, loss rate, and occupancy.

20. A packet-switched network including a plurality of nodes, comprising:

a distributed performance measurement system, including
a) a node monitor in each node including
i) an epoch monitor, wherein said epoch monitor monitors the arrival and departure of packets to and from said node over N epochs, maintains information for each of said packets, and, using said information, performs simple calculations to determine epoch-level performance characteristics over each epoch;
ii) an aggregate monitor, wherein said aggregate monitor is in communication with said epoch monitor and, after said N epochs, receives said epoch-level performance characteristics from said epoch monitor and, using said epoch-level performance characteristics, performs more processing-intensive calculations than said epoch monitor to determine node-level performance characteristics;
b) a network monitor, wherein said network monitor is in communication with each of said plurality of nodes and periodically receives said node-level performance characteristics from each node, and, using said node-level performance characteristics, performs calculations to determine network-level performance characteristics.

21. The network of claim 20, wherein said network monitor is designed to initiate synchronization of said nodes.

22. The network of claim 20, wherein epoch-level performance characteristics include busy time and delay for a virtual channel in a node.

23. The network of claim 22, wherein epoch-level performance characteristics further include number of cells, number of packets, number of lost packets, and occupancy for a virtual channel in a node, and wherein delay includes peak delay and total delay for all packets in a given epoch for a virtual channel in a node.

24. The network of claim 20, wherein node-level perforce characteristics include effective rate and delay for a virtual channel in a node.

25. The network of claim 24, wherein no level performance characteristics further include throughput, occupancy, and loss rate for a virtual channel in a node.

26. The network of claim 25, wherein node-level performance characteristics further include delay fluctuation.

27. The network of claim 20, wherein network-level performance characteristics include effective rate and delay for a virtual channel end-to-end.

28. The network of claim 27, wherein network-level performance characteristics further include throughput, loss rate, and occupancy for a virtual channel end-to-end.

29. The method of claim 1, wherein determining the portion of the predetermined period of time during which a queue for the viral channel of the node is not empty comprises maintaining a data structure representing the virtual channel, the data structure listing one or more arrival times for one or more cells of the virtual channel.

30. The method of claim 29, wherein the data structure listing one or more arrival times for one or more cells of the virtual channel is structured as a linked list.

31. An article of manufacture comprising a machine accessible medium having content to provide instructions to cause an electronic device to:

determine an effective rate for a virtual channel in a node including to determine the total number of cells to pass through the node during a predetermined period of time, and calculate a portion of the predetermined period of time during which a queue for the virtual channel of the node is not empty the effective rate based on a throughput rate when there is data in a queue corresponding to the virtual channel; and provide the determined effective rate for a virtual channel to a network monitor.

32. The article of manufacture of claim 31, wherein to determine the portion of the predetermined period of time during which a queue for the virtual channel of the node is not empty comprises maintaining a data structure representing the virtual channel, the data structure listing one or more arrival times for one or more cells of the virtual channel.

33. The article of manufacture of claim 32, wherein the data structure listing one or more arrival times for one or more cells of the virtual channel is structured as a linked list.

* * * * *